United States Patent [19]

Anania et al.

[11] Patent Number: 4,900,530
[45] Date of Patent: Feb. 13, 1990

[54] PROCESS FOR THE PRODUCTION OF SILICON TETRAFLUORIDE

[75] Inventors: Guido Anania, Gela; Angelo Bianchi, Ravenna; Vito Cultrera, Gela; Francesco Russo, Monza; Giovanni Spagna, Vittoria, all of Italy

[73] Assignee: Enichem Agricoltura S.p.A., Palermo, Italy

[21] Appl. No.: 76,736

[22] Filed: Jul. 23, 1987

[30] Foreign Application Priority Data

Jul. 23, 1986 [IT] Italy ................ 21226 A/86

[51] Int. Cl.$^4$ ............................................ C01B 33/08
[52] U.S. Cl. ...................................... 423/342; 55/71; 423/240
[58] Field of Search ............. 423/341, 210, 240 S, 423/342; 55/71

[56] References Cited

U.S. PATENT DOCUMENTS

| | | | |
|---|---|---|---|
| 2,456,509 | 12/1948 | Hopkins et al. | 55/71 |
| 3,323,870 | 6/1967 | Baldrey et al. | 423/342 |
| 3,758,674 | 9/1973 | Parish et al. | 423/341 |
| 4,138,509 | 2/1979 | Ingle et al. | 423/342 |
| 4,457,901 | 7/1984 | Kitsugi et al. | 423/342 |
| 4,557,921 | 12/1985 | Kirsch et al. | 55/71 |

FOREIGN PATENT DOCUMENTS

| | | | |
|---|---|---|---|
| 156317 | 9/1982 | Japan | 423/342 |
| 90810 | 5/1985 | Japan | 423/342 |
| 97129 | 5/1986 | Japan | 423/342 |
| 61-118117 | 6/1986 | Japan | 423/210 |

Primary Examiner—John Doll
Assistant Examiner—Wayne A. Langel
Attorney, Agent, or Firm—Birch, Stewart, Kolasch & Birch

[57] ABSTRACT

A continuous process is disclosed for the production, with a high yield, of high purity silicon tetrafluoride, starting from an aqueous solution of fluorosilicic acid, which comprises:

(a) reacting an aqueous solution of fluorosilicic acid with concentrated sulphuric acid, carried out with a short residence time and preferably under fluidodynamic conditions of turbulence, inside a reaction zone;

(b) separating a gaseous stream containing silicon tetrafluoride from a liquid stream of aqueous sulphuric acid, carried out inside a separation zone, directly connected with the reaction zone;

(c) washing said gaseous stream with concentrated and cold sulphuric acid carried out inside a washing zone, for the purpose of separating a gaseous stream of purified silicon tetrafluoride; and, possibly (d) further purifying said gaseous stream of purified silicon tetrafluoride by means of techniques of adsorption on an adsorbent solid material.

7 Claims, 1 Drawing Sheet

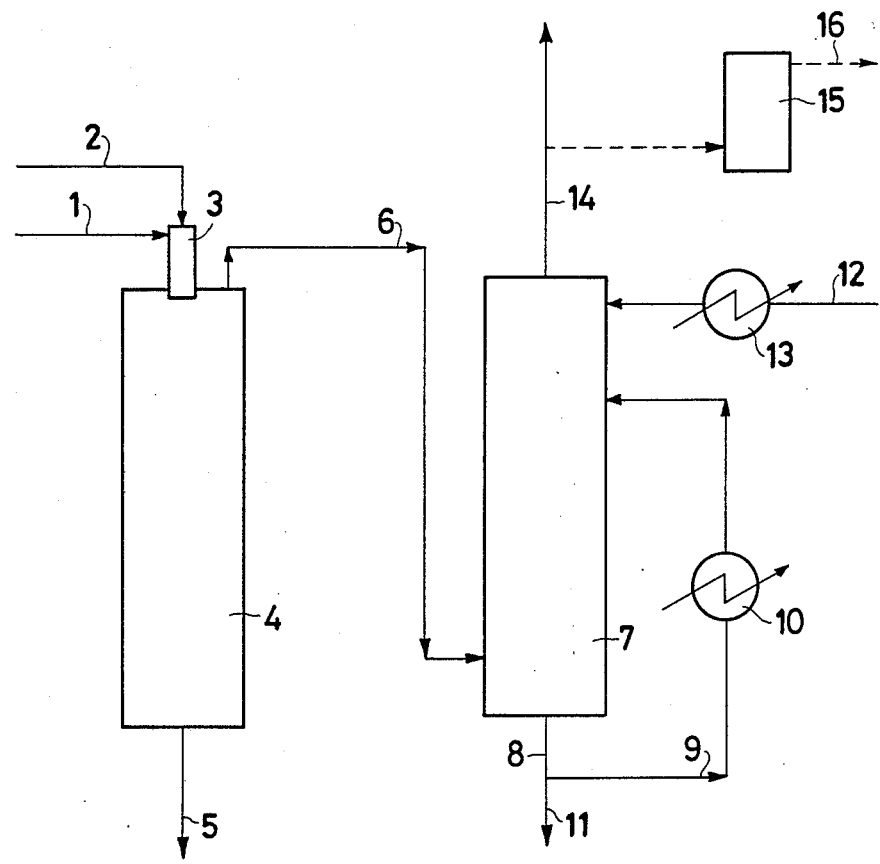

PROCESS FOR THE PRODUCTION OF SILICON TETRAFLUORIDE

The present invention relates to a continuous process for the production, with a high yield, of high purity silicon tetrafluoride, starting from an aqueous solution of fluorosilicic acid.

Silicon tetrafluoride is an important intermediate, useful for the production of valuable products, such as pure silica, silanes, pure silicon for solar cells, silicon nitride for ceramic products and fluorinated carbon-silicon polymers for materials for architectural uses. For better information, reference is made to the specification of the following patents: U.S. Pat. No. 3,969,485; U.S. Pat. No. 4,374,111; U.S. Pat. No. 4,442,082; U.S. Pat. No. 4,458,087; and Japan 59174506.

In the art, processes are known for producing hydrofluoric acid and silicon tetrafluoride, starting from aqueous fluorosilicic acid, such as disclosed, e.g., in the following patents: U.S. Pat. No. 3,969,485; U.S. Pat. No. 3,218,124; and U.S. Pat. No. 4,062,930.

According to such processes of the prior art, the reaction is carried out inside a stirred reactor, to which a stream of concentrated sulphuric acid, or oleum, and a concentrated aqueous solution of fluorosilicic acid is fed, for developing hydrofluoric acid and silicon tetrafluoride in the form of a gas stream, which is submitted to a washing step with concentrated sulphuric acid. An undesired characteristic common to these processes of the prior art is constituted by the low yields of conversion of fluorosilicic acid into silicon tetrafluoride, above all due to phenomena of hydrolysis, leading to the formation of silica.

In U.S. Pat. No. 4,470,959, a process is disclosed, according to which a stream of aqueous fluorosilicic acid is fed to an intermediate point between the head and the bottom of a vertical tower, and a stream of concentrated sulphuric acid is fed near the head of the tower, and from the head of the tower an overhead gas stream containing silicon tetrafluoride is recovered, and from the bottom of the tower a stream of diluted sulphuric acid is recovered.

By means of this process, yields of useful reaction product within the range of 95.4% to 98.5% are achieved, with a content of hydrofluoric acid in the so-produced silicon tetrafluoride, being lower than 0.1% by volume (equivalent to about 200 ppm by weight).

In general, the aqueous fluorosilicic acid used in the processes of production of silicon tetrafluoride, comes from the units of fluorine separation of the facilities of production of phosphoric acid by the wet process. These aqueous solutions contain several impurities, and, in particular, compounds of boron, phosphorus and arsenic elements which remain, even if in trace amounts, in the silicon tetrafluoride. Eliminating such impurities, which are highly harmful, in particular when silicon tetrafluoride is used for the production of elemental silicon of solar or semiconductor grade, is a technical problem.

On the basis of such a state of the prior art, the need was felt for having available a simple and cheap process for preparing silicon tetrafluoride free, or substantially free from impurities, and especially from those impurities which endanger its use in the production of elemental silicon of solar or semiconductor grade, obtained continuously and in improved yields.

Such a need is fulfilled by means of the process of the present invention, according to which:

(a) an aqueous solution of fluorosilicic acid, at a concentration of at least 8% (w/w) and sulphuric acid at a concentration of at least 90% (w/w) are reacted with each other, a preferably operating under turbulent conditions, and with a contact time longer than 1 second, inside a self-maintaining reaction zone at a temperature of at least 90° C., and under a pressure slightly higher than ambient pressure, to produce gaseous silicon tetrafluoride;

(b) the gaseous stream containing silicon tetrafluoride is separated from a liquid stream of diluted aqueous sulphuric acid, by operating at a temperature of at least 70° C. inside a separation zone, directly connected with the reaction zone;

(c) the gaseous stream is washed with cold sulphuric acid having a concentration of at least 96% (w/w), inside a washing zone, for the purpose of producing a gaseous stream of purified silicon tetrafluoride; and, optionally (d) the gaseous stream of purified silicon tetrafluoride is furthermore purified by being contacted with an absorbent solid material.

The sole FIGURE of the Drawing represents a flow diagram of the process according to the invention.

By conducting the process hereinabove within the range of other conditions as hereunder specified, conversion yields of fluorosilicic acid into silicon tetrafluoride are achieved, which are equal to, or higher than, 99% (as expressed as Si), whereby silicon tetrafluoride is obtained having a content of hydrofluoric acid lower than 35 ppm (w/w) and a content of boron, phosphorus and arsenic respectively lower than 1, 10 and 4 ppb (w/w), suitable.

Step (a)

In (a) step of the process of the present invention, a stream of aqueous fluorosilicic acid and a stream of concentrated sulphuric acid are independently fed to a reaction zone, wherein they are brought into contact, and caused to react with each other.

Normally, the aqueous solution of fluorosilicic acid contains fluorosilicic acid at a concentration within the range of from 8 to 30% (w/w), and preferably of from 12 to 20% (w/w). This aqueous solution can come from the fluorine removal units of the facilities for the production of phosphoric acid by the wet process. In this case, the solution contains several impurities, in particular boron, phosphorus and arsenic compounds.

The concentrated sulphuric acid used in the process of the present invention has a concentration within the range of from 90 to 100% (w/w), and preferably in the order of from 96 to 99% (w/w).

The two streams are continuously fed to a tubular reactor, inside which a fluido-dynamic regime of turbulence is preferably maintained. The streams are preferably not pre-heated, and the temperature which is established in the reactor depends essentially on the water balance inside the system. However, under the above shown conditions, the temperature is at least 90° C., and is generally within the range of from 90° to 120° C. The reaction is furthermore carried out under a pressure slightly higher than ambient pressure, e.g., under a relative pressure higher than 30 kPa, and generally 40 to 50 kPa, and with a residence time of approximately 10 seconds.

Under these conditions, an instantaneous and optimum mixing of the reactants occurs, and a substantially complete conversion of fluorosilicic acid into gaseous hydrofluoric acid and gaseous silicon tetrafluoride is achieved, according to the equation:

$$H_2SiF_6 \xrightarrow{\text{conc. } H_2SO_4} SiF_4 + 2 HF$$

An advantage of the process of the present invention is the fact that aqueous solutions also containing a low level of fluorosilicic acid can be used, with the phenomena of hydrolysis, leading to the formation of silica, according to the equation:

$$SiF_4 + 2 H_2O \longrightarrow SiO_2 + 4 HF$$

being avoided.

The so-obtained reaction mixture is directly sent to a separation zone, directly connected with the reaction zone.

Step (b)

In (b) step of the process of the present invention, a gaseous stream, containing silicon tetrafluoride, is separated from a liquid stream of diluted acqueous sulphuric acid.

This separation can be carried out inside any equipment for gas/liquid separation, such as, e.g., a packed tower, a tray tower, a spray tower, a film tower, and so forth.

In a preferred embodiment, the tubular reactor, inside which the reaction of the step (a) is carried out, is positioned on the top of and coaxially with the separation tower of step (b) and the reaction product flows directly from the reaction zone to the upper portion of the separation zone.

Furthermore, inside the separation zone, the separation process is carried out at a temperature of from 70° to 120° C., and under a slight relative pressure (of the order of 1.5 kPa), causing a gaseous stream of silicon tetrafluoride containing hydrofluoric acid, plus trace amounts of water vapour to be separated, at a temperature equal to or slightly higher than the reactor temperature. This gaseous stream, which is generated in the upper portion of the separation zone, is sent to the washing with sulphuric acid in the step (c).

Furthermore, from the bottom of the separation zone, sulphuric acid is recovered, at a concentration which can vary within the range of from 60 to 90% (w/w), and preferably from 78 to 82% (w/w), which contains traces of fluorine ions, essentially present as dissolved hydrofluoric acid, in amounts which are typically of the order of 0.3–0.9% (w/w). This acid can be directly used as the acid for the chemical attack of phosphatic rocks in the production of phosphoric acid by the wet process. Alternatively it can undergo regeneration treatments.

Step (c)

According to the process of the present invention, the gaseous stream produced in the (b) step is submitted to a washing with cold, concentrated sulphuric acid in a washing zone.

For that purpose, a washing tower can be used, which ensures a good gas-liquid contact, e.g., a packed tower, a tray tower, and the like.

The gaseous stream coming from the (b) step, which contains, besides silicon tetrafluoride, hydrofluoric acid and water vapour, is fed to a point close to the bottom of the washing zone, at a temperature equal to or nearly equal to the temperature at the outlet from the separation zone.

At a point close to the top of the washing zone sulphuric acid is fed, which has a concentration of preferably at least 96% (w/w), pre-cooled, e.g., at a temperature of 10° C. or less, and anyway at a temperature higher than the freezing point of the same acid.

By operating under the above-disclosed conditions, from the bottom of the washing zone a stream of sulphuric acid is drawn, which has a concentration typically of the order of 94–96% (w/w), and with a content of fluorine ions typically lower than 1% (w/w).

The control of the temperature in the washing zone can be advantageously accomplished by recycling a portion of said bottom stream, after a preliminary cooling inside a heat exchanger.

Also this stream of sulphuric acid can be directly used for the chemical attack of phosphatic rocks, or, as an alternative, it can undergo regeneration.

Furthermore, by operating within the range of the above indicated conditions, at the top of the washing zone a stream of purified gaseous silicon tetrafluoride is produced, which contains, in any case, less than 35 ppm (w/w) of hydrofluoric acid.

Step (d)

According to the process of the present invention, the stream of purified silicon tetrafluoride can be submitted to a further purification, for the purpose of completely, or substantially completely, eliminating, possible impurities, such as boron, phosphorus and arsenic compounds.

This purification is carried out by making the gaseous stream flow over an adsorbed solid material, and in particular over activated charcoal.

By this treatment, the content of arsenic is reduced from a typical value of 2–5 ppm (w/w) to less than 4 ppb (w/w), this last value being the limit of detectability utilizing standard analytical technique.

By means of this treatment, a silicon tetrafluoride is obtained, which is suitable for preparing elemental silicon for specialized uses such as in solar cells, and in electronics, such as in semiconductors.

According to a preferred embodiment of the present invention, powder silica is introduced together with the aqueous solution of fluorosilicic acid.

In this way, the amount of hydrofluoric acid is reduced, due to the occurrence of the reactions:

$$SiO_2 + 2 H_2SiF_6 \longrightarrow 3 SiF_4 + 2 H_2O$$

$$SiO_2 + 4 HF \longrightarrow SiF_4 + 2 H_2O$$

The following experimental example is illustrative but not limitative of the present invention.

EXAMPLE

The process is carried out by means of a continuous pilot plant, with a production potentiality of approximately 0.3 kg/hour of silicon tetrafluoride, which is schematically shown in the Figure of the drawing table.

In this Figure, there are indicated: with (3) the tubular reactor; with (4) the separation tower, packed with Raschig rings; and with (7), the washing tower filled with Raschig rings. These pieces of equipment, as well as the connection lines, are made from a corrosionresistant material (teflon; polyvinylidene fluoride, etc.).

In particular, referring to the Figure to the reactor (3) 2.48 kg/hour of an aqueous solution of fluorosilicic acid at a concentration of 14.9% (w/w) (line 2) and 8.89 kg/hour of sulphuric acid at 99% (w/w) (line 1) are fed.

The aqueous fluorosilicic acid contains the following impurities: boron, 1 ppm (w/w), arsenic, 15 ppm (w/w) and phosphorus, 0.3% w/w. Furthermore, the temperature of the fed streams is of about 20° C.

Inside reactor (3), the reaction is self-maintained at the temperature of approximately 120° C., under a relative pressure of approximately 50 kPa, with a contact time of about 9 seconds.

The reaction mixture passes directly from the reactor (3) to the underlying separation tower (4), operating under a relative pressure of about 1.3 kPa; from said tower (4), a liquid bottom stream (line 5) is separated, at the temperature of approximately 90° C., which is constituted by sulphuric acid at a concentration of 81% (w/w), and with a content of hydrofluoric acid of about 0.55% (w/w) and of silicon of about 25 ppm (w/w), and at the top of tower 4 (line 6) a gaseous stream at the temperature of 110° C. develops, which contains silicon tetrafluoride, hydrofluoric acid and traces of water vapour, which is fed to the bottom of the washing tower (7). To the top of said tower (7) (line 12) a stream is fed, which consists of 2.0 kg/hour of sulphuric acid at a concentration of 99% (w/w), cooled to about 12° C. in the heat exchanger 13.

From the bottom of tower (7) (line 8) a liquid stream is discharged, which has a concentration of 96.8% (w/w), and contains 0.2% (w/w) of hydrofluoric acid.

A portion of this stream is recycled to the tower (7), through the line (9), after a preliminary passage through the heat exchanger (10), for cooling it to approximately 12° C.

The remaining portion of the bottom stream is discharged through the line (11).

The stream of gaseous silicon tetrafluoride coming from the tower (7), containing 3 ppm (w/w) of arsenic, is conveyed, by means of the line (14), to the tower 15, packed with granules of activated charcoal.

From the tower 15, through the line (16), 0.32 kg/hour is recovered of silicon tetrafluoride, with a yield higher than 99%.

This silicon tetrafluoride, at the mass spectrometry analysis, shows the following impurities: hydrofluoric acid, lower than 20 ppm (w/w); boron, lower than 1 ppb (w/w); phosphorus, lower than 10 ppb (w/w); and arsenic, lower than 4 ppb (w/w).

We claim:

1. A process for the preparation of silicon tetrafluoride comprising:
    (a) contacting a 12–20% (w/w) aqueous solution of fluorosilicic acid with 90–100% (w/w) of an aqueous solution of sulphuric acid at a contact time of at least 1 second, in a reaction zone, said reaction zone operating at a temperature of from 90° C. to 120° C. and under a pressure greater than 30 kPa, said contacting resulting in the liberation of a gaseous stream of silicon tetrafluoride;
    (b) separating said gaseous stream of silicon tetrafluoride from a liquid stream of a diluted aqueous solution of sulphuric acid produced in a separation zone, said separation zone operating at a temperature of from 70° C. to 120° C. and connected directly with and positioned below said reaction zone;
    (c) washing said gaseous stream of silicon tetrafluoride with cold sulphuric acid havng a concentration of at least 96% (w/w), in a washing zone; said cold sulphuric acid having a temperature higher than the freezing point of said sulphuric acid to 10° C., and
    (d) contacting said stream of gaseous silicon tetrafluoride with activated charcoal.

2. The process according to claim 1, wherein in said (b) step said separation is carried out at a temperature of from 70° to 120° C., under pressure, inside equipment for gas/liquid separation.

3. The process according to claim 2, wherein the reaction zone of step (a) is positioned at the top of and coaxial with the separation zone of step (b).

4. A process for the preparation of silicon tetrafluoride comprising:
    (a) contacting an 8–30% (w/w) aqueous solution of fluorosilicic acid with 90–100% (w/w) of an aqueous solution of sulphuric acid at a contact time of greater than 1 second, in a reaction zone, said reaction zone operating at a temperature of from 90° C. to 120° C. and under a pressure greater than 30 kPa, said contacting resulting in the liberation of a gaseous stream of silicon tetrafluoride;
    (b) separating said gaseous stream of silicon tetrafluoride from a liquid stream of a diluted aqueous solution of sulphuric acid produced in a separation zone, said separation zone operating at a temperature of from 70° C. to 120° C. and connected directly with said reaction zone;
    (c) washing said gaseous stream of silicon tetrafluoride with cold sulphuric acid having a concentration of at least 96% (w/w), in a washing zone; and
    (d) contacting said stream of gaseous silicon tetrafluoride with activated charcoal.

5. The process according to claim 4, wherein in said (a) step, said concentration of fluorosilicic acid is within the range of from 12 to 20% (w/w), and said concentration of sulphuric acid is within the range of from 96 to 99% (w/w), said reaction is carried out inside a tubular reactor under turbulent conditions and for a contact time of approximately 10 seconds.

6. The process according to claim 5, wherein said tubular reactor of said (a) step is positioned at the top of, and coaxially with, the separation tower of said (b) step.

7. The process according to claim 4, wherein in said (c) step said washing is carried out with said cold sulphuric acid having a concentration of about 96% (w/w), and precooled at a temperature of about higher than the freezing point of said sulfuric acid to 10° C.

* * * * *